United States Patent Office 3,422,748
Patented Jan. 21, 1969

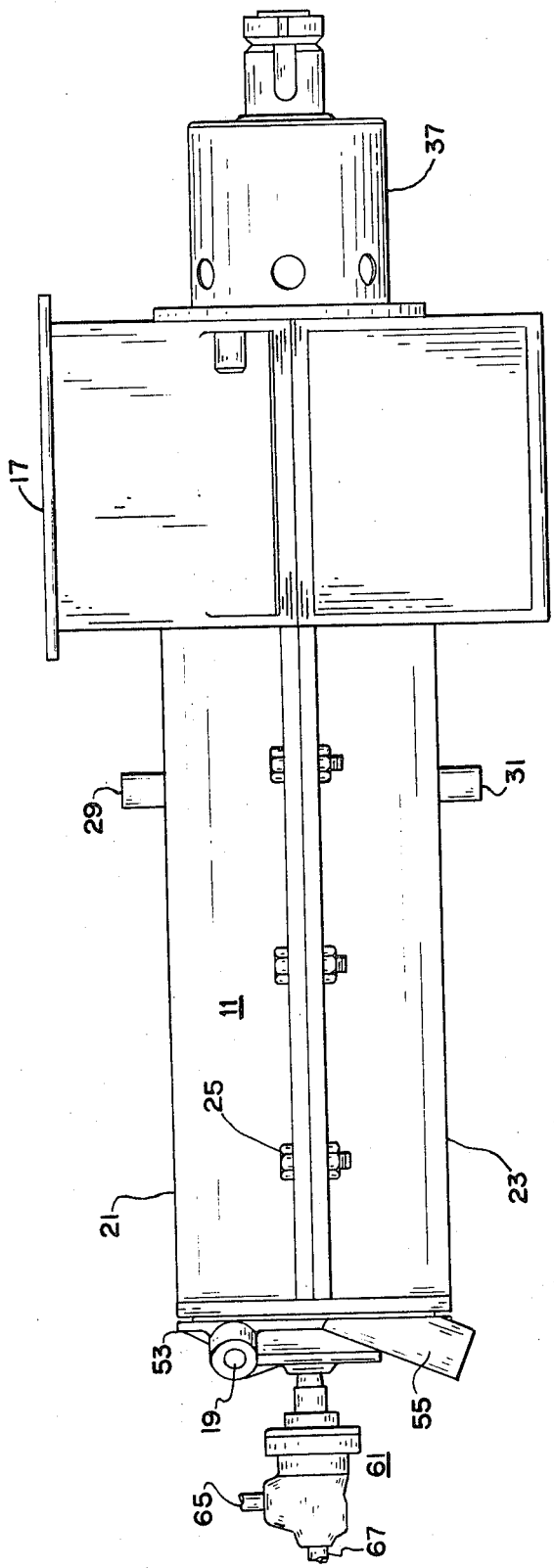
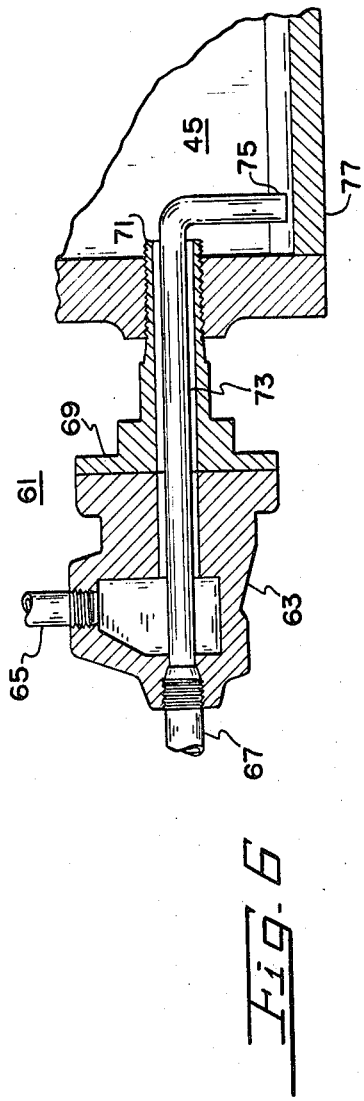

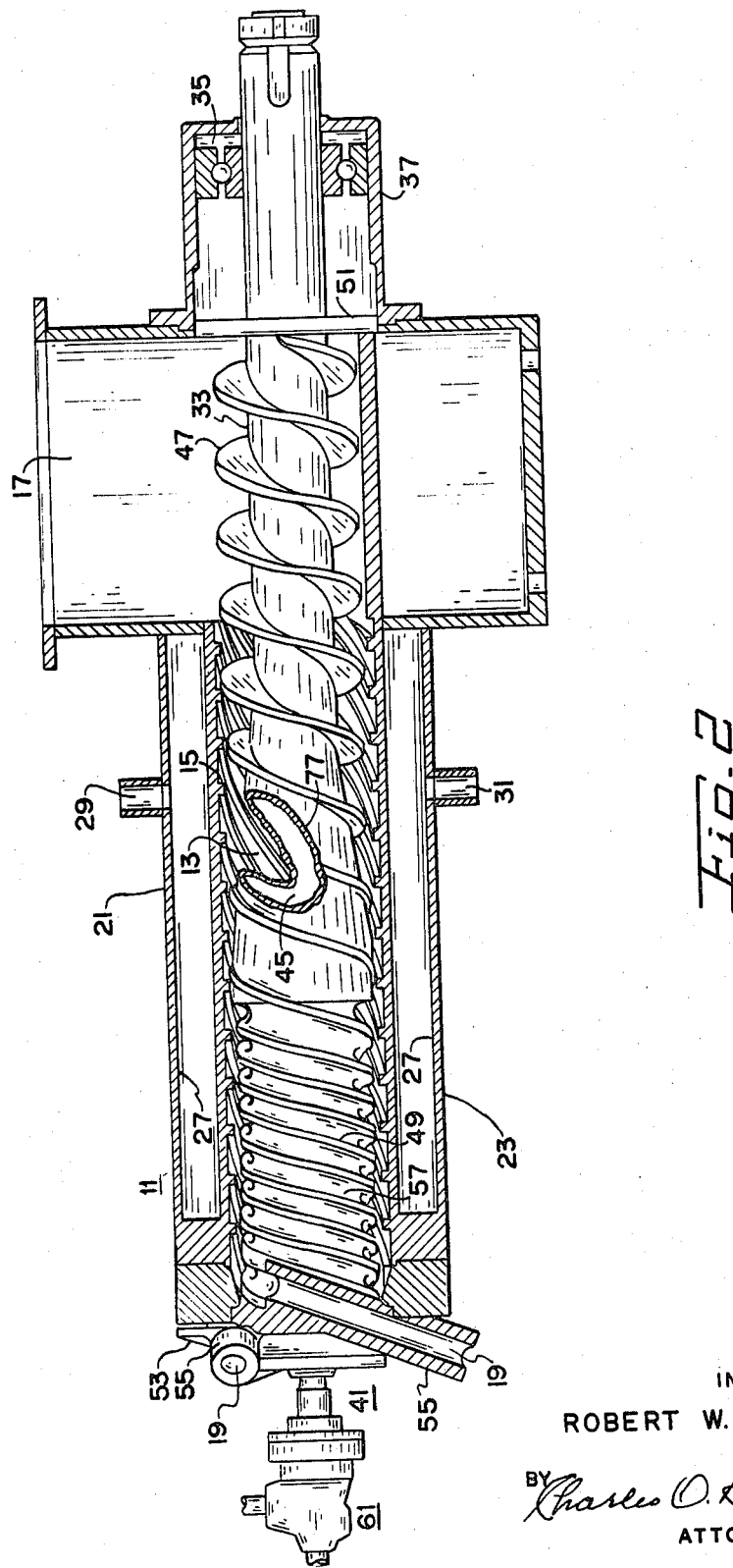

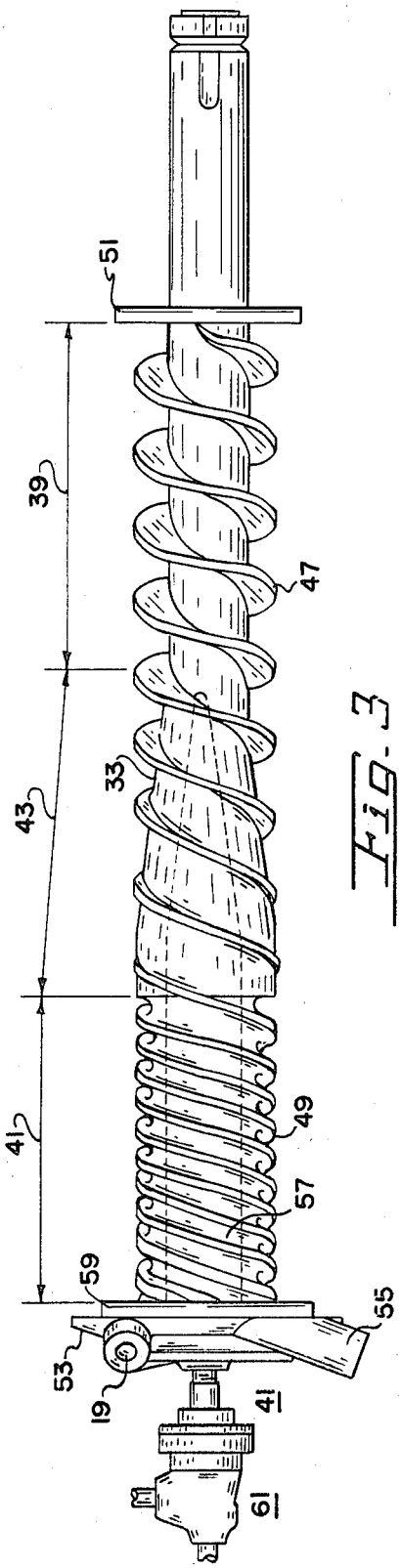
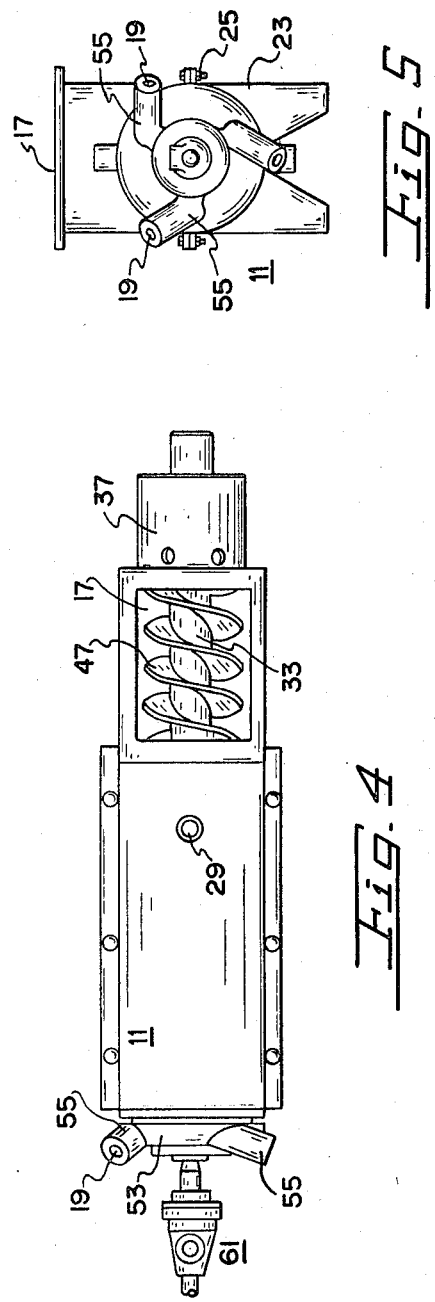

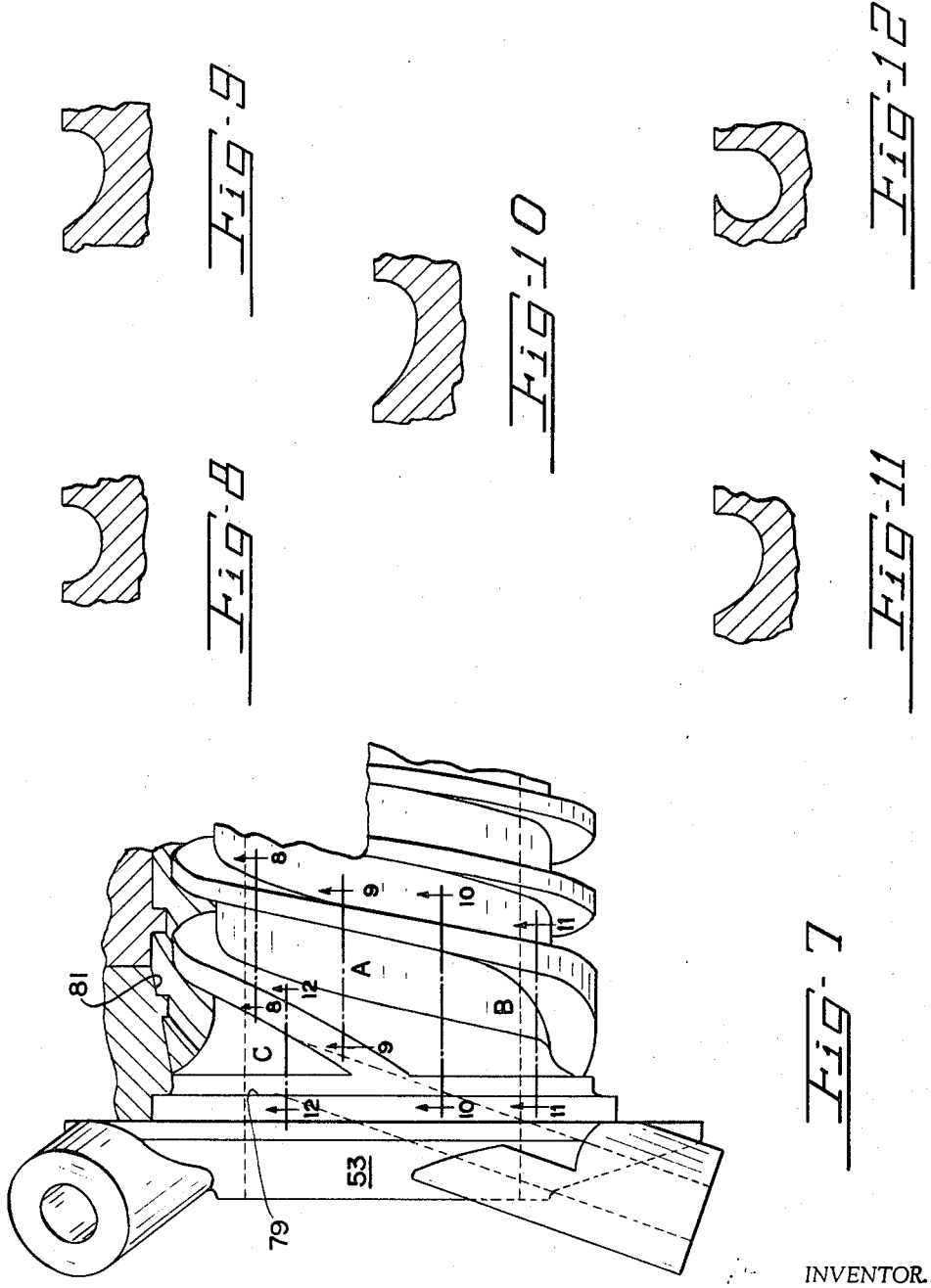

3,422,748
AXIAL EXTRUSION MILL
Robert W. Gilman, San Francisco, Calif., assignor to California Pellet Mill Company, San Francisco, Calif., a corporation of California
Filed Dec. 27, 1966, Ser. No. 604,965
U.S. Cl. 100—93        15 Claims
Int. Cl. B30b 15/34; B02c 11/08; B29f 3/06

The present invention relates to feed mills and more particularly to an axial type extrusion mill for the pelleting of fibrous vegetable materials.

The advantages of pelleting various materials, and the means for effecting the pelleting of certain materials, have been known for many years. In general, pelleting processes take a loose bulky material, having physical characteristics ranging from a fine light dusty powder to small granules, and compress the material into a variety of pellet shapes and sizes possessing increased bulk density. The result is a compact, tough, dust-free produce that is usually free flowing, and uniform in size, color, and appearance.

Pellets produced by these processes are quite stable and durable and are therefore resistant to disintegration and/or breakage. When a bulk material acquires these characteristics, many of the processing or handling problems usually encountered with a bulk material are eliminated. Particle size control is achieved; dust and its hazards are reduced; and undersized particles can be reclaimed. The resulting product can be processed and handled more efficiently and materials handling economies can be experienced in packaging and through reductions of storage space.

In pelleting processes, the material is compressed under extreme pressure and forced through die holes. As the pellets are extruded, knives shear the pellets to the desired length. Some pelleting dies are in the form of a circular disc and have a series of parallel vertical die holes. Rollers on the upper surface of the die force material downward through the die holes. In the more recent types of dies and roller arrangements, the die consists of an annular ring having generally radial holes extending through the ring. The rollers are locted internal of the die ring and force the material outward through the holes. In some arrangements the die ring is fixed and the rollers move around in the die; in other arrangements the rollers are fixed and the die ring rotates about the rollers.

Although these arrangements of dies and rollers efficiently process certain materials, other materials are not susceptible to pelleting by these machinery arrangements. There are many materials which can be generally described as, but not limited to, fibrous vegetable materials which cannot be processed satisfactorily through dies having short die holes. An example of such a material is hay or alfalfa having a moisture content of approximately 10%. To pellet this type of material, it is desirable to force the material through a much longer die hole than is practically possible with present machinery arrangements while applying heat to the material during compaction and immediately prior to extrusion.

In order to effect an extrusion arrangement to provide a long die hole with a die surface which can simultaneously apply heat to the material being processed, a new and novel pelleting machine has been conceived which provides the required characteristics heretofore described. The present invention is an axial type extrusion mill which comprises, briefly, a housing having a longitudinally grooved cylindrical bore with a bulk material inlet adjacent one end thereof, the other end being the discharge end. The housing includes a jacket means for containing a heating fluid in surrounding relation around at least a portion of the housing. A generally hollow impeller body is disposed in the bore of the housing and is supported for rotation therein. The impeller body has an expanding diameter for at least a portion of the length thereof in a direction toward the discharge end of the housing. The impeller body is surrounded by at least one helical blade which cooperates with the grooved bore of the housing to move the bulk material along the bore when the impeller rotates. The impeller body has an enlarged boss at the discharge end of the housing which is provided with at least one tangential nozzle. The nozzle communicates with the passage defined by the helical blade, the housing, and the impeller body to discharge the compressed vegetable material from the mill. A heating fluid injection and removal means is provided for inducing a heating fluid into the hollow interior of the impeller body.

It is therefore an important object of the present invention to provide a pellet extrusion mill for extruding fibrous vegetable material.

It is another object of the present invention to provide a pellet extrusion mill having a relatively long effective die.

It is a further object of the present invention to provide a pellet extrusion mill having heated die passages.

It is yet another object of the present invention to provide a pellet extrusion mill for the extrusion of fibrous vegetable materials which can be easily cleaned.

Other objects and advantages of the present invention will become apparent when the pellet extrusion mill is considered in conjunction with the accompanying drawings of which:

FIGURE 1 is a side elevation of a preferred embodiment of the axial extrusion mill of the present invention;

FIGURE 2 is a sectional view of FIGURE 1;

FIGURE 3 is a side elevation of the impeller of the extrusion mill of the present invention;

FIGURE 4 is a plan view of the extrusion mill of the present invention;

FIGURE 5 is an end elevation of the discharge end of the extrusion mill of the present invention;

FIGURE 6 is a side elevation schematic detail of the heating fluid injection and removal means;

FIGURE 7 is a detail view of a portion of FIGURE 3;

FIGURE 8 is a sectional detail along line 8—8 of FIGURE 7;

FIGURE 9 is a sectional detail along line 9—9 of FIGURE 7;

FIGURE 10 is a sectional detail along line 10—10 of FIGURE 7;

FIGURE 11 is a sectional detail along line 11—11 of FIGURE 7; and

FIGURE 12 is a sectional detail along line 12—12 of FIGURE 7.

Reference is made to the drawings for a detailed description of a preferred embodiment of the present invention. The housing 11 of the extrusion mill (FIGURE 1) has a cylindrical bore 13 extending the length thereof. Internal of the cylindrical bore is a multiplicity of helical ridges 15 which are formed on the internal wall of the housing and which extend substantially the length thereof. The ridges form longitudinal grooves therebetween. The ridges can be straight but are preferably helical. The latter configuration is a more efficient structure for moving material through the mill.

A bulk material inlet opening 17 is disposed at one end of the cylindrical housing while the product discharge 19 is located at the opposite end from the inlet opening 17.

The housing is split longitudinally into upper and lower halves 21, 23 and securing means, such as bolts 25, are provided for detachably sealing the halves together.

The housing also includes a jacket means, such as a steam jacket 27, for containing a heating fluid in surrounding relation for at least a portion of the length of the housing 11. This permits heating of the walls of the housing bore. A steam inlet 29 is disposed at the top of the jacket while a condensate outlet 31 is disposed at the bottom of the jacket.

An impeller body 33 is disposed in the bore of the housing and is supported for rotation therein. The inlet end of the body is supported by bearings 35 disposed outboard of the bulk material inlet 17 in the rear end 37 of the housing.

The impeller body has three material working sections. The first section 39, which is disposed in the inlet section of the housing, has a generally constant relatively small diameter which extends from the inlet end of the housing to the discharge side of the bulk material inlet 17. The diameter of the body is relatively small in proportion to the internal bore of the housing to permit the bulk material to be disposed longitudinally between the blades of the impeller and to enter the bore of the housing. The discharge end 41 of the impeller body has a generally constant relatively large external diameter with respect to the first section of the impeller body, but it is smaller than the internal diameter of the helices or ridges 15 formed on the internal wall of the housing. Between the two end sections the body of the impeller has an expanding diameter section 43 which interconnects those sections.

A portion of the impeller body is hollow to permit the injection of steam thereinto for heating the external surface of the body. Preferably, the internal cavity 45 extends the length of the large diameter section and for a portion of the length of the expanding diameter section 43.

A helical blade 47 is secured to the impeller body and has a reverse angle of helix with respect to the helical ridges 15 which are formed on the internal wall of the housing bore. The blade 47 extends along the impeller body from a point adjacent the inlet end of the housing to the end of the expanding diameter portion 43 of the impeller. Approximately from the area where the single blade stops, a multiplicity of helical impeller blades 49, having a lesser angle of helix than the single blade, extend to the discharge end of the housing along the larger diameter section 41 of the impeller body. The impeller body can also be formed with multiple blades in the area of the single blade 47.

A sealing disc 51 is secured to the rear end of the impeller at the rearward end of the housing inlet 17 to effect a seal between the impeller and the cylindrical bore of the housing adjacent the end of the helical blade 47. The disc also keeps the incoming bulk material from fouling the rear impeller bearing 35.

A nozzle plate 53 is secured to the discharge end of the impeller body for sealing that end of the housing bore. The nozzle plate includes a multiplidity of tangential nozzles 55 equal in number to the number of helix blades 49 formed on the discharge end of the impeller. The nozzles 55 are aligned with the grooves 57 between those blades so as to form the pellets discharging from the extrusion mill.

The nozzle plate 53 also forms part of the bearing support for the impeller at the discharge end thereof. The bearing surface 59 of the nozzle plate is relatively small as it only forms a support for the impeller when the machine is empty. While the mill is in operation, the material being forced through it supports the impeller generally concentric to the bore of the housing and effectively prevents any unbalanced or unidirectional loading between the impeller and the housing.

A heating fluid injection and condensate removal means are provided for inducing a heating fluid into the hollow interior of the impeller body and removing any condensate therefrom during rotation of the impeller. This is effected by a rotatable steam coupling 61 which is secured to the nozzle plate 53. The coupling has a fixed portion 63 attached to which are a steam supply line 65 and a condensate removal line 67 and a rotatable portion 69 which is secured to the rotatable nozzle plate. The steam and condensate lines communicate with the interior of the impeller body through the rotatable portion of the coupling. In the preferred embodiment, the rotatable steam couplings include a pair of concentric tubes; an outer one 71 for steam injection and an inner one 73 for condensate removal. The intake end 75 of the condensate removal tube depends from the axis of the rotor plate to the lowest point in the impeller body, i.e., near the lower surface of the wall 77 of the impeller body adjacent the rotor plate. The steam is injected into the chamber through the outer concentric tube 71 and the condensate removed from the chamber through the inner tube 73 by suction or steam pressure. These two way rotary steam joints are commercially available.

A critical feature of the present invention is the configuration of the discharge end of the impeller body where the material being processed transitions into the nozzles. This transition area is defined by a channel configuration between the blades 49 of the impeller which permits the internal wall of the housing to decrease in bore and approach the peripheral diameter of the impeller body adjacent the nozzle plate. The material being processed is forced completely into the space between the blades to effect transition into the nozzles.

One means of achieving a proper transition area which effects the desired results is to provide a widening of the spacing between the blades 49 at the discharge end of the impeller for a portion of their length. This is effected by increasing the pitch of the blades 49 as they approach to merge with the rear face 79 of the nozzle plate 53. This is illustrated best in FIGURE 7 of the drawings in the area designated A, but it is not shown in FIGURE 2 due to the difficulty in illustrating the configuration in that cross-sectional view.

FIGURE 7 shows parting lines at the roots of the blades where there is actually a compounded curved surface area, but it is believed these parting lines add clarity to the illustration. The cross section of the grooves is illustrated by the successive cross section views of FIGURES 8–12. It will be noticed that in each of the cross sections, except that shown by FIGURE 12, that the right wall of inlet side of the groove has a normal configuration but that the left wall has a more gradually hollowed out shape.

A further characteristic of the transition area includes a deepening of the grooves between the blades adjacent the entrance to the nozzle. This occurs in areas B and C of the grooves shown in FIGURE 7. These areas are where the blade approaches the rear face 79 nozzles plate and increases in pitch to merge with the nozzle plate. FIGURE 11 shows an increase in depth as the width between the blades begins to decrease. FIGURE 12 shows the configuration of the groove as it starts to transition into the cylindrical shape of the nozzle passages. It will be noticed that the groove is deeper and the left wall overhangs to close the top of the groove.

It is also an important requirement of the invention that the helices 15 on the internal wall of the housing extend to the end of the bore 13 of the housing. In other words, the ridges are formed on the portion 81 of the internal wall which approaches the peripheral diameter of the impeller body. This portion 81 of the internal wall is best illustrated by FIGURE 7, but can also be seen in FIGURE 2.

The bulk or feed material which is processed in the present invention is generally of a fibrous vegetable nature and has been predried to prevent excessive generation of steam and gas removal problems in the extrusion mill. The predried material is fed into the inlet of the axial mill and propelled along the bore thereof toward the discharge end by means of the impeller blade coacting with the internal helical ridges of the bore to drive the material forward. It is the resistance of the material to shear which drives it forward.

The compaction of the material is accomplished by the reducing pitch and expanding core of the impeller at the beginning of the multiple flight section which squeezes the bulk material by wedging it against the internal walls of the bore of the housing. The bulk material is then forced into the discharge nozzles where it is formed into cylindrical pellets.

The length of the die hole is equal to the circumferential helical length of the grooves between the blades plus the length of the tangential nozzle holes. The die hole in effect extends from the end of the expanded diameter portion of the impeller, where the multiple blades begin, on through the nozzle plate.

A heating fluid, such as steam, heats both the wall of the bore of the housing and the surface of the impeller body. This permits the material being processed in the grooves between the helical blades to be subjected to heating for a relatively long processing cycle, i.e., the length of time it takes the material to pass from the feed inlet and out the nozzles. The nozzles are also quite hot due to heat transfer from the impeller body, and due to frictional heating by the material passing through them, whereby the nozzles further add to the heating cycle.

One of the most outstanding features of this invention is its ability to efficiently process into pelleted form coarse ground material and unground stringy material. This is due to the structural arrangement of the mill which effects primarily compacting action on the material processed with little attendant grinding action. Grinding requires power and the effect itself is often undesirable in processing many products.

The present invention has another very important feature which is the capability of being able to apply heat during the compacting process and to force a material through an elongated die hole without grinding whereby it can pelletize unground materials such as fibrous and coarse ground vegetable and chemical materials.

Another important advantage of the present invention is its structural arrangement which allows the whole impeller to be removed as a single unit by removing a single retainer. The impeller is held in the housing by a locking means, which can be a nut or lock ring, secured to the rear end of the impeller shaft external to the rear end of the housing 37. In the preferred embodiment, a drive pulley is secured to the exposed shaft at the rear end of the housing and functions as the retaining means. The locking means is necessary to keep the impeller from being forced out of the housing during operation, but when the retainer is removed the impeller is easily slipped out of the housing. The internal walls of the mill can easily be exposed by disassembly of the casing halves (21 and 23).

While a preferred embodiment of the present invention has been described, other forms of the invention can be considered which fall within the scope of the invention as contemplated here. For example, by providing a vertical right angle feed chute to the bulk material inlet, the mill could be supported vertically thereby facilitating heating and reducing floor space requirements. The heating fluid could be introduced at the top end of the compressor shaft or impeller body 33 and removed from the bottom thereby eliminating the need for the two-way rotary joint 61.

Although the impeller is shown as a unitary structure in the present embodiment, it is also contemplated that under some conditions of feeding the mill, or with different products, it may be necessary to increase the angular velocity of the single blade portion of the impeller in order to properly feed the more closely disposed blades at the discharge end of the housing. If the bulk material being fed to the machine is not significantly precompacted, it would be necessary to move the entering bulk material at a faster rate. This could be accomplished by any number of means but would probably involve utilizing a two-stage impeller. Each stage could be driven from its own end and they could be journalled internally at their junctions in the middle of the bore, or one section of the impeller could be driven from one end and the other end internally gear driven by the driven section at the proper ratio.

Under many conditions, the necessity of a two-stage impeller could be eliminated by feeding this axial extrusion mill by a bulk material blocking machine such as disclosed in U.S. Patent No. 3,230,902, Device for Making Blocks of Vegetable, Animal or Mineral Matter. Such a machine would precompact the fibrous vegetable material to the proper feed density whereby the disclosed impeller arrangement would suffice to effect the pelleting thereof.

As a further alternative, it may be desirable to invert the working relation of the elements of the preferred embodiment and discharge pellets through stationary nozzles in the housing. This can be effected by decreasing the depth of the grooves between the blades on the impeller until it becomes cylindrical at its discharge end and by deepening the grooves between the helices formed on the internal walls of the housing. In other words the core of the impeller body is increased in diameter until it approaches the peripheral diameter of the body, or the internal bore of the helical ridges, adjacent its discharge end. Stationary nozzles could then be formed in the housing skewed forward, tangential, and in line with the grooves in the housing. Use of this arrangement would permit numerous nozzles to be employed and numerous nozzles might eliminate the critical nature of the transition area of the impeller. However, the same rule with respect to the rotating nozzle embodiment would be applicable, and the transition area would require that the grooves between the helices on the internal wall of the housing be sufficient to contain all of the material being moved through the mill in the area where the core of the impeller is cylindrical.

It will be apparent from the foregoing description of the invention, in its preferred form, that it will fulfill all the objects attributable thereto. While it has been illustrated and described in considerable detail, the invention is not to be limited to such details as have been set forth except as may be necessitated by the appended claims.

I claim:

1. An axial type extrusion mill for pelleting fibrous vegetable and coarse ground materials comprising
    a housing having a longitudinally grooved cylindrical bore with a bulk material inlet adjacent one end thereof, the other end being the discharge end, said housing including a jacket means for containing a heating fluid in surrounding relation around at least a portion of said housing,
    a generally hollow impeller body disposed in the bore of said housing and supported for rotation therein, said impeller body having an expanding diameter in a direction toward the discharge end for at least a portion of the length thereof,
    at least one helical blade surrounding said impeller body for at least a portion of its length and cooperating with the grooved bore of said housing to move bulk material along said bore when said impeller rotates,
    nozzle means disposed at the discharge end of said mill and arranged substantially tangential to said impeller body said nozzle means communicating with the passage defined between the housing and the impeller body to discharge compressed material from said mill, and
    heating fluid injection and removal means for inducing a heating fluid into the hollow interior of said impeller body.

2. The axial type extrusion mill of claim 1 wherein said grooved cylindrical bore of said housing includes a multiple of helix ridges in said bore for cooperating with the helical blade of said impeller for moving vegetable material along said bore, said ridges having a reverse angle of helix with respect to said blade.

3. The axial type extrusion mill of claim 1 wherein said impeller body is retained in said housing by a single retaining means engaging said body at the inlet end of said mill.

4. The axial type extrusion mill of claim 1 wherein said impeller body has an elongated boss at its discharge end provided with at least one tangential nozzle.

5. The axial type extrusion mill of claim 4 wherein said impeller is surrounded by at least a single helical blade which extends from the area of said housing inlet to the end of the expanding diameter portion of the body and by a multiplicity of helical blades from the end of the expanding diameter portion of the body to the discharge end of said housing, and said enlarged boss includes a nozzle for each passage defined by the helical blades, the housing, and the impeller body.

6. The axial type extrusion mill of claim 4 wherein the discharge end of said impeller body in the area where the material being processed transitions into the nozzle is defined by a channel configuration between the blades of said impeller which permits the internal wall of said housing to decrease in bore and approach the peripheral diameter of the impeller body whereby the material being processed is forced completely into the space between said blades to transition into said nozzle and the internal wall of said housing has a tapered bore at the discharge end thereof which decreases to approach the peripheral diameter of the impeller body.

7. The axial type extrusion mill of claim 6 wherein said transition portion at the discharge end of said impeller includes a widening of the spacing between said blades for a portion of their length adjacent said boss by increasing the pitch of the blades proximate thereof.

8. The axial type extrusion mill of claim 6 wherein said transition portion at the discharge end of said impeller includes a deepening of the groove between said blades adjacent the entrance to said nozzle.

9. The axial type extrusion mill of claim 1 wherein said nozzle means is formed in said housing and includes a multiplicity of nozzles.

10. The axial type extrusion mill of claim 9 wherein said impeller body is surrounded by at least a single helical blade which extends for a portion of the length of the impeller body from the inlet end thereof and by a multiplicity of helical blades extending from the end of the single helical blade for a portion of the expanding diameter portion of the body.

11. The axial type extrusion mill of claim 9 wherein the discharge end of said housing in the area where the material being processed transitions into the nozzles is defined by a channel configuration between the helical ridges of said housing which permits the core of said impeller body to increase in diameter and approach the bore of said helical ridges whereby the material being processed is forced completely into the space between said ridges to transition into said nozzles and the diameter of the core of said impeller body increases to approach the peripheral diameter of said body adjacent its discharge end.

12. An axial type extrusion mill for pelleting fibrous vegetable and coarse ground materials comprising a housing having an inlet opening at one end thereof, a discharge at the other end thereof, a jacket means for containing a heating fluid in surrounding relation for at least a portion of the length of said housing, and a cylindrical bore extending between said inlet and said discharge, said bore including a multiplicity of helical ridges extending substantially the length of said bore, a generally hollow impeller body disposed in the bore of said housing and supported for rotation therein and retained in said housing by a single retaining means engaging said body at the inlet end of said mill, said body having a generally constant relatively small diameter at the inlet end of said housing and a generally constant relatively large diameter at the discharge end of said housing and an intermediate portion having a diameter expanding toward said discharge end interconnecting the large and small generally constant diameter sections of said body, at least a single helical impeller blade secured to the body of said impeller and having a reverse angle of helix with respect to the helical ridges of said bore, said blade extending along said impeller from the inlet end thereof to the end of the expanding diameter portion of said impeller, a multiplicity of helical impeller blades having a lesser angle of helix than said single blade and extending along said impeller body from the end of said expanded diameter section to the discharge end of said housing, the discharge end of said impeller body in the area where the material being processed transitions into the nozzle being defined by a channel configuration between the blades of said impeller which permits the internal wall of said housing to decrease in bore and approach the peripheral diameter of the impeller body whereby the material being processed is forced completely into the space between said blades to transition into said nozzle, a tapered bore in the internal wall of said housing at the discharge end thereof which decreases to approach the peripheral diameter of said impeller body, a nozzle plate secured to the discharge end of said impeller body for sealing the discharge end of said housing bore and including a multiplicity of tangential nozzles equal in number to the number of helical blades but aligned with the grooves between those blades on the discharge end of said impeller to discharge the compressed material from said mill, and heating fluid injection means and condensate removal means for inducing a heating fluid into the hollow interior of said impeller body and removing any condensate therefrom during rotation of the impeller.

13. The axial type extrusion mill of claim 12 wherein said impeller body has a sealing disc secured to said impeller at the inlet end of said housing for providing a seal with said cylindrical bore adjacent the inlet end of said helical blade, said transition portion at the discharge end of said impeller includes a widening of the spacing between the blades for a portion of their length adjacent said boss by increasing the pitch of the blades proximate thereof and deepening the groove between said blades adjacent the entrance to said nozzle, and said housing is split longitudinally into upper and lower halves to facilitate cleaning of said bore and includes securing means for detachably securing said halves together.

14. An axial type extrusion mill for pelleting fibrous vegetable and coarse ground materials comprising a housing having an inlet opening at one end thereof, a discharge at the other end thereof, a jacket means for containing a heating fluid in surrounding relation for at least a portion of the length of said housing, and a cylindrical bore extending between said inlet and said discharge, said bore including a multiplicity of helical ridges extending substantially the length of said bore, a generally hollow impeller body disposed in the bore of said housing and supported for rotation therein, said body having a generally constant relatively small diameter at the inlet end of said housing and a relatively large diameter at the discharge end of said housing and an intermediate portion having a diameter expanding toward said discharge end interconnecting the large and small diameter sections of said body, the core diameter of said large diameter section increasing adjacent the discharge end to approach the bore of said helical ridges, a multiplicity of nozzle means formed in said housing and arranged substantially tangential to said impeller body, said nozzle means communicating with the passage defined between the housing and the impeller body to discharge compressed material from said mill, the discharge end of said housing in the area where the material being processed transitions into the nozzles being defined by a channel configuration between the helical ridges of said housing which permits the peripheral diameter of said impeller body to increase and approach the bore of said helical ridges whereby the material being processed is forced completely into the space between said ridges to transition into said nozzle means, at least a single helical impeller blade secured to the body of said impeller and having a reverse angle of helix with respect to the helical ridges of said bore, said blade extending along said impeller from the inlet end thereof for at least a portion of the length of the expanding diameter portion of said impeller, a multiplicity of helical impeller blades having a lesser angle of helix than said single blade and extending along said impeller body from the end of said single helical blade for at least a portion of the length of the large diameter portion of said impeller body terminating short of the discharge end thereof, and heating fluid injection means and condensate removal means for inducing a heating fluid into the hollow interior of said impeller body and removing any condensate therefrom during rotation of the impeller.

15. The axial type extrusion mill of claim 14 wherein said impeller body has a sealing disc secured to said impeller at the inlet end of said housing for providing a seal with said cylindrical bore adjacent the inlet end of said helical blade, and said housing is split longitudinally into upper and lower halves to facilitate cleaning of said bore and includes securing means for detachably securing said halves together.

References Cited

UNITED STATES PATENTS

| | | |
|---|---|---|
| 1,906,245 | 5/1933 | Bowling. |
| 1,990,632 | 2/1935 | Bowling. |
| 2,144,055 | 1/1939 | Hall. |
| 2,857,624 | 10/1958 | Hanzel et al. |
| 3,191,229 | 6/1965 | Vanzo _____ 18—12 |
| 3,225,685 | 12/1965 | King et al. |
| 3,230,902 | 1/1966 | Grimm et al. _____ 107—14 |

WALTER A. SCHEEL, *Primary Examiner.*

U.S. Cl. X.R.

18—12; 100—145